United States Patent [19]
McKinney, II

[11] 3,833,249
[45] Sept. 3, 1974

[54] INDOOR AND OUTDOOR DEBRIS PAN
[76] Inventor: Richard F. McKinney, II, P.O. Box 252, New Galilee, Pa. 16141
[22] Filed: Apr. 18, 1973
[21] Appl. No.: 352,476

[52] U.S. Cl............ 294/1 R, 15/104.8, 15/257.1, 224/49, 294/55
[51] Int. Cl............................................. A47l 13/52
[58] Field of Search....... 294/1 R, 49, 55; 15/104.8, 15/257.1, 257.4; 56/400.01, 400.04, 400.11, 400.12; 224/45 R, 45 D, 45 E, 49

[56] References Cited
UNITED STATES PATENTS

| | | | |
|---|---|---|---|
| 440,618 | 11/1890 | Byers | 15/257.4 |
| 2,564,907 | 8/1951 | Krummel | 294/1 R |
| 2,608,706 | 9/1952 | Wakefield | 294/26.5 X |
| 2,876,474 | 3/1959 | Loewy | 15/104.8 |
| 3,107,936 | 10/1963 | Parsons | 294/55 |
| 3,481,519 | 12/1969 | Snetselaar | 224/49 |
| 3,493,154 | 2/1970 | Engle | 224/49 |

Primary Examiner—Richard A. Schacher
Assistant Examiner—Johnny D. Cherry
Attorney, Agent, or Firm—Clarence A. O'Brien; Harvey B. Jacobson

[57] ABSTRACT

A dustpan-type debris gathering, carrying and trash bag or can loading implement for use indoors or outdoors comprising a flat-faced flexibly resilient sheet of moldable normally flat plastic material atop which debris, such as grass clippings, twigs, loose leaves and miscellaneous lawn trash, can be raked, swept or scooped up and safely and expeditiously emptied into a trash bag or can. The sheet is substantially rectangular in plan and has a bevelled leading edge for scooping up and guiding litter atop the sheet and a barrier or limit stop wall across and forwardly of the trailing edge. The upper edge of the wall has an oblique angled flange provided with a rolled thumb grasping bead. The forward leading edge portion is indented and fashioned into a finge accommodating well or receiver which, in turn, embodies an overhanging finger retaining ledge.

4 Claims, 4 Drawing Figures

PATENTED SEP 3 1974 3,833,249
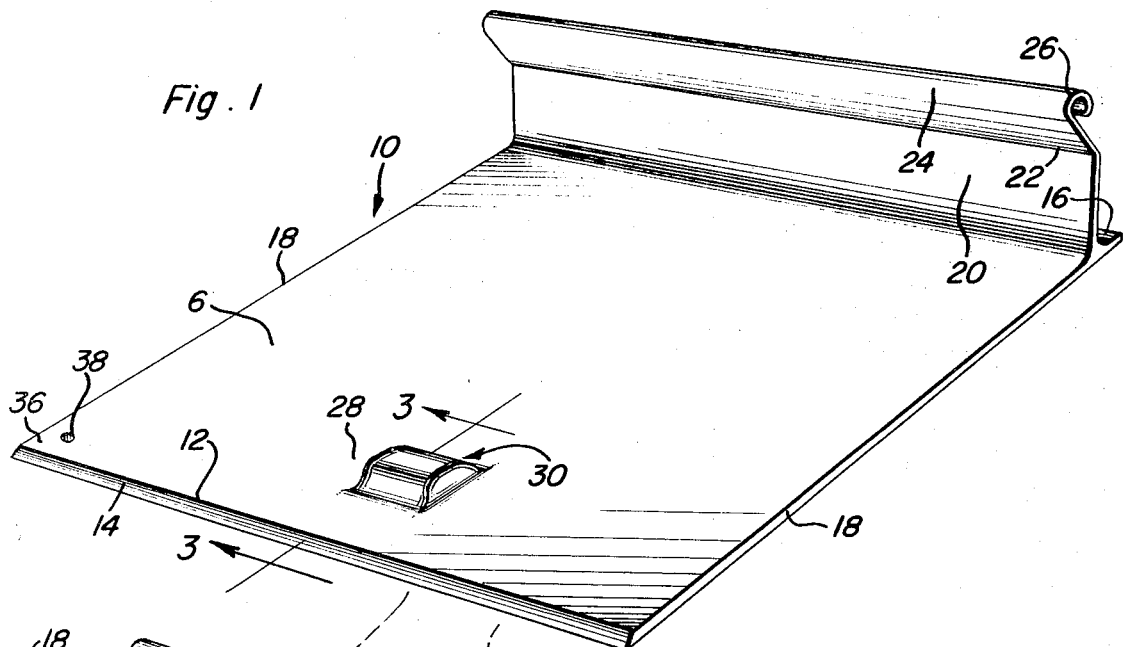
Fig. 1
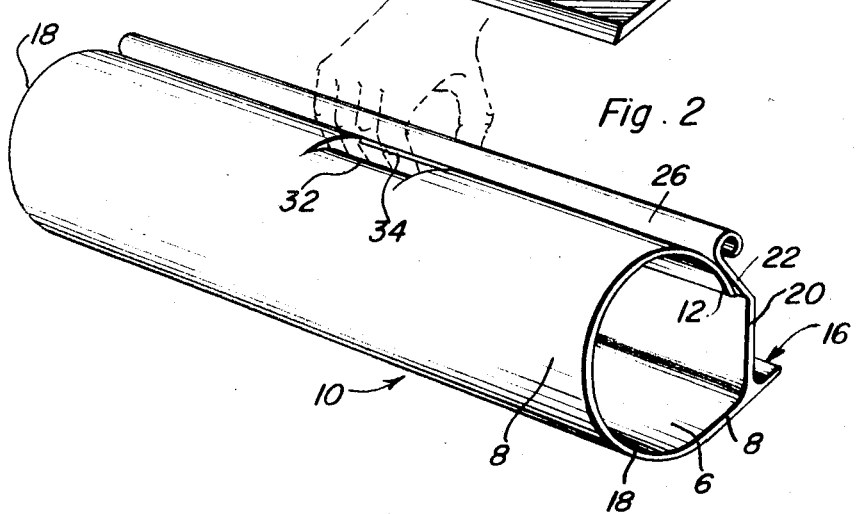
Fig. 2
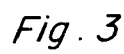
Fig. 3
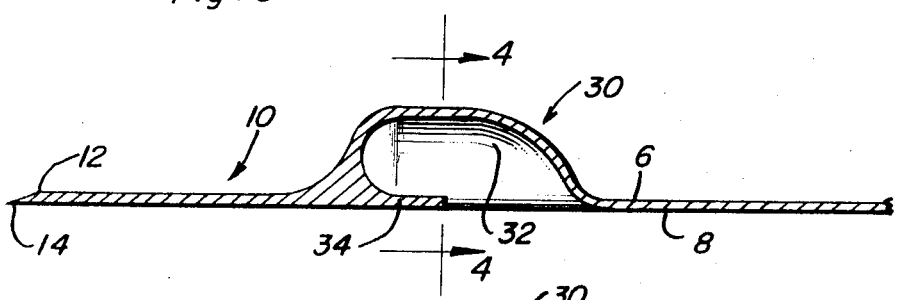
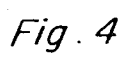
Fig. 4
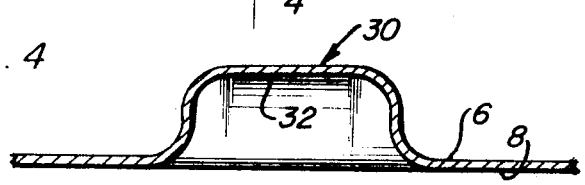

INDOOR AND OUTDOOR DEBRIS PAN

This invention relates to a novel dustpan-type multipurpose debris scooping, gathering and handling implement and has to do, more particularly, with a flat-faced bendably resilient sheet which serves as a pan and which lends itself to safe and expeditious use indoors or outdoors and greatly assists the user when called upon to gather and handle small pipes of difficult-to-cope-with trash and litter preparatory to loading the same in a trash bag or can, as the case may be.

The herein disclosed concept is comparable, generally speaking, to a conventional short-handled shovel-like dustpan having a deflected leading edge which is angled and pressed against a surface or similar foundation and into which dust and litter from the same is brushed or otherwise swept. Instead of being made of metal, as is generally the case, the improved pan is made of moldable bendably resilient plastic material and provides a highly satisfactory aid in the collection and disposal of miscellaneous trash in one's house, barn, garage, yard or other area, indoors or outdoors, as the case may be.

For background purposes and because it is made of bent sheet material, reference may be made to the scoop shown in U.S. Pat. No. 1,330,548 granted to Charles H. Nowack. As further exemplary of the state of the art to which the invention relates the reader, if so desired, may take into account and evaluate the trash pickup device shown in U.S. Pat. No. 2,564,907 granted to William H. Krummel, Jr. Finally and although it is relatively complicated, attention may be accorded the leaf scoop disclosed in U.S. Pat. No.2,545,226 issued to Charles J. Claude.

In carrying out the principles of the instant invention and with a view toward advancing the art under consideration it will be evident that the instant invention is an innovation in that it is of one-piece construction, made of appropriately bendable resilient sheet material. The sheet when in normal flat but pliant form constitutes a safe and expeditiously usable scoop and pan. When coiled or rolled into tubular form, it functions to compact the trapped debris and permits the same to be carried and otherwise handled and emptied into a trash bag, trash can or in such other manner as may be desired by the user.

Briefly miscellaneous debris, grass clippings, twigs, loose leaves, lawn trash and dirt, can be raked and scooped up then captively wrapped and timely emptied and dumped into a pile, trash bag or otherwise conveniently disposed of.

These together with other objects and advantages which will become subsequently apparent reside in the details of construction and operation as more fully hereinafter described and claimed, reference being had to the accompanying drawings forming a part hereof, wherein like numerals refer to like parts throughout.

FIG. 1 is a view in perspective of a multipurpose debris pan constructed in accordance with the principles of the invention and showing the body thereof in flat ready-to-use position.

FIG. 2 is a view also in perspective and based on FIG. 1 and which shows the aforementioned step wherein the litter or trash (not shown) is wrapped or bundled in a manner for safe carrying and handling and dumping, if desired, into a trash bag or trash can, as the case may be.

FIG. 3 is an enlarged detail section taken approximately on the plane of the section line 3—3 of FIG. 1 looking in the direction of the indicating arrows and which serves to bring out the indented or recessed hand-hold, also referred to as a finger pocketing receiver.

FIG. 4 is a view at right angles to FIG. 3 taken approximately on the plane of the vertical section line 4—4 of FIG. 3.

Referring now to the views of the drawing the dustpan-type debris gathering and handling implement is, manifestly, such in construction that it lends itself to practical and safe use in one's house, barn, garage, yard or the like. It is characterized by a flexibly resilient or pliant sheet of moldable plastic material having planar or flat top and bottom surfaces 6 and 8. The major or body portion of the sheet or pan, as it is sometimes called, is designated by the numeral 10 and is generally rectangular in plan. The forward or leading transverse edge portion is denoted at 12 and is provided with a forwardly and downwardly inclined bevel or chamfer as at 14. This provides a suitable trash scooping guide and facilitates brushing or sweeping the trash onto the normally flat accumulating surface 6. The opposite transverse or trailing edge or end is denoted by the numeral 16. The edges 12 and 16 are substantially parallel to each other and are joined by longitudinal side marginal edges 18. With reference in particular to the edge portion 16 it will be observed that the top surface is provided inwardly of and proximal to the edge 16 with a vertical or upstanding barrier wall 20. This wall serves not only in handling the device but as a sort of a limit stop when the trash or other material is swept atop the surface 6. The upper edge portion 22 of this wall is provided with an upwardly and forwardly inclined or oblique-angled flange 24 which terminates in a return bend which is fashioned into a rounded thumb-accommodating and gripping bead 26. This flange and bead tend to overhang the coacting surface portion 6 and not only rigidify the wall-equipped end but facilitate handling this end of the overall debris gathering and handling pan. The median or generally central portion 28 adjacent or proximal to the transverse edge 12 is indented, that is recessed and fashioned into an upstanding suitably shaped and proportioned indentation 30. It is clear that this component is shown in top plan in FIG. 1. The underneath side is fashioned into and provides a receiver or well which is of ample shape and size as at 32 to accommodate the tips of the fingers of the hand in the manner suggested in FIG. 2. For better results the indentation also includes an overhanging flange 34 which provides a ledge-like seat for the fingers as shown.

Because the implement or device is used primarily outdoors it has been and may be referred to as a yard pan.

With a view toward better serving the overall purposes and as best shown in FIG. 1 at least one corner portion 36 is provided with an appropriate nail hole 38 which facilitates hanging or suspending the device when it is not being used. It is reiterated that normally the inherent resiliency of the product is such that the sheet or body portion 10 is flat. On the other hand and in using the device on the surface of a lawn, patio or walkway the handling means at the right in FIG. 1 can be utilized to pitch or angle the sheet at will such as is done when handling an ordinary dustpan. After sufficient loose trash or debris is gathered atop the surface 6 the leading or bevelled end portion 12 is rolled or coiled upon itself to accomplish the result seen in FIG. 2 wherein, it will be noted, the terminal edge portion 14 is tucked and retained underneath and against the then existing bottom surface of the aforementioned flange 24. Considering FIGS. 1 and 2 in single as well as conjoint relationship it will be evident that the scooping, wrapping and handling results can be readily achieved. FIGS. 3 and 4 in particular bring out the contour and utility of the ledge-equipped pocketing recess 32. By thus accommodating both the thumb and fingers it will be evident that the rolled formation of FIG. 2 can be readily accomplished and maintained for carrying and emptying purposes.

It is contemplated that the finished product will be made of a size, shape and weight for easy handling use keeping in mind that the body portion must be thin and yieldable and yet sufficiently strong that it may be bent and then returned to its original spread and ready-to-use position shown in FIG. 1. Experience has shown that the invention lends itself to single-handed use and expedites the step of discharging the collected debris in a trash bag. As a matter of fact experience has also shown that use of the invention minimizes the hazard of cut fingers particularly when one is called upon to gather and pick-up loose trash in a gutter, on a finished driveway surface or any similar surface where scooping up trash with the hands could be and often is dangerous.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. For use indoors or outdoors, a manually usable dustpan-like debris gathering and handling implement comprising: a normally flat sheet of material embodying a surface atop which variegated debris (grass clippings, twigs, loose leaves and miscellaneous lawn trash) can be raked, swept or scooped up for safe handling, said sheet of material resembling and constituting a pan, having leading and trailing marginal edges and complemental side marginal edges, and also embodying self-contained carrying and handling means, said leading edge being straight-across and bevelled forwardly and downwardly and providing a debris pickup and guiding lip, the trailing edge portion being provided with an upstanding barrier wall, said wall having an upwardly and forwardly angled flange and said flange having a lengthwise overhanging edge formed into a bead which, in turn, provides a thumb-grip, a median forward edge portion of said sheet being indented and providing a finger receiving and pocketing grip which, when in use, is proximal to and cooperative with said thumb-grip.

2. The debris gathering and handling implement defined in and according to claim 1, and wherein said indentation embodies an enclosed finger seating and position-retaining ledge.

3. The debris gathering and handling implement defined in and according to claim 2, and wherein said guiding lip is designed and adapted to abut and assume a predetermined roll-forming position in contact with an overlapping surface of said forwardly angled flange.

4. A dustpan-type debris gathering and handling implement for use in one's house, barn, garage, yard or the like comprising a flexibly resilient sheet of plastic material having transverse leading and trailing marginal edges joined by longitudinal side marginal edges, said sheet having planar top and bottom surfaces, the leading edge being bevelled forwardly and downwardly and providing a debris pickup and guiding lip, a median portion of said sheet rearwardly of but adjacent to said leading edge being indented and providing a finger receiving and pocketing recess with an overhanging finger accommodating ledge, said trailing edge portion being formed with an integral upstanding barrier wall, said wall having an upwardly and forwardly angled flange, said flange having a lengthwise overhanging edge formed into a rounded bead, said bead providing a thumb-grip.

* * * * *